Feb. 18, 1947.  E. D. REEVES ET AL  2,416,217
CATALYTIC CONVERSION OF HYDROCARBON OILS
Filed June 3, 1941
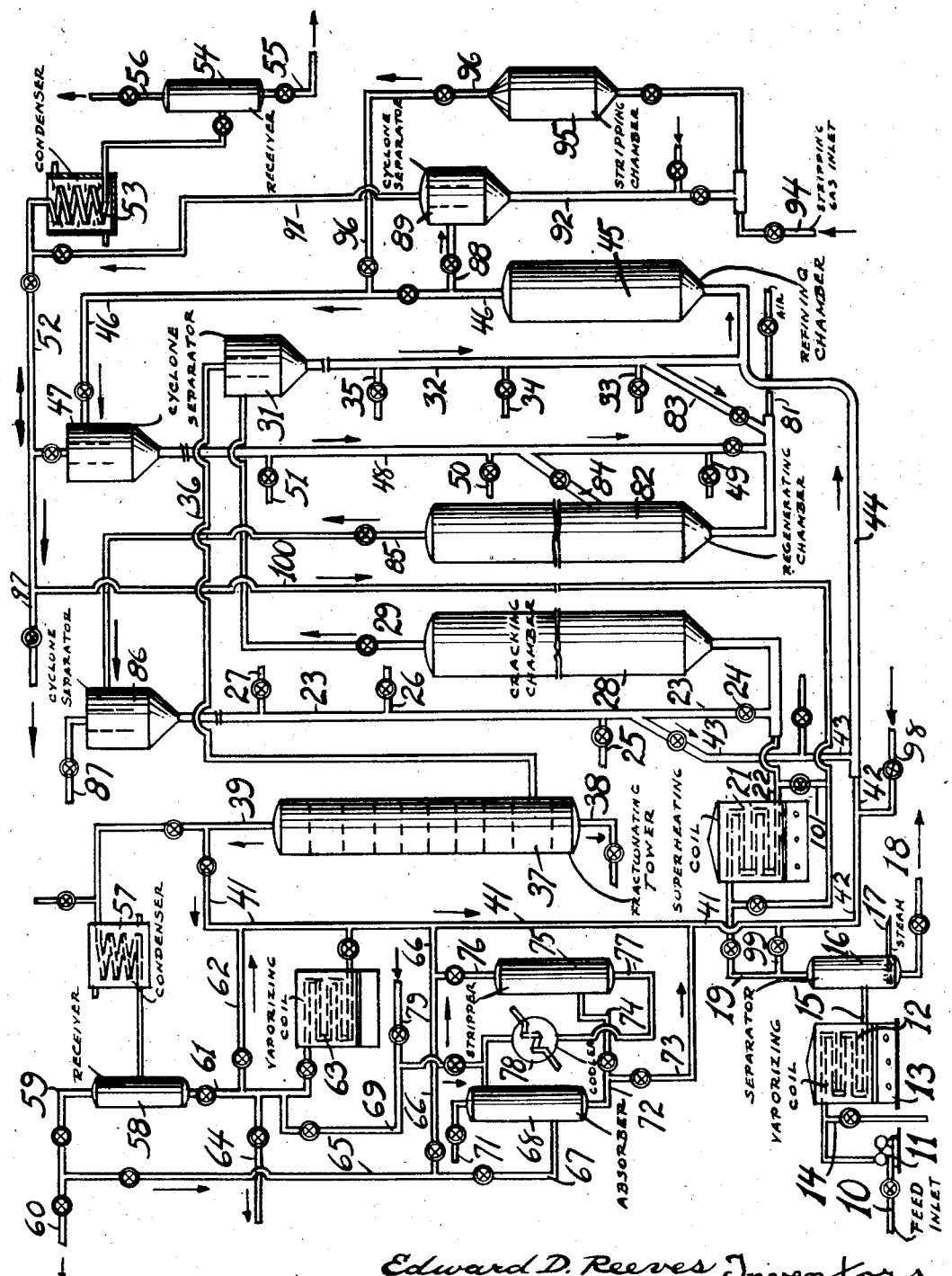
Edward D. Reeves  Inventors
John C. Munday
By _____ Attorney Patented Feb. 18, 1947

2,416,217

UNITED STATES PATENT OFFICE 2,416,217

CATALYTIC CONVERSION OF HYDROCARBON OILS

Edward D. Reeves and John C. Munday, Cranford, N. J., assignors to Standard Oil Development Company, a corporation of Delaware Application June 3, 1941, Serial No. 396,374

15 Claims. (Cl. 196—49)

1

This invention is directed to the catalytic conversion of hydrocarbon oils and pertains more particularly to processes in which the catalyst or contact material in finely-divided form is mixed or otherwise contacted with the oil or oils to be treated.

The invention finds more particular application to combination processes involving a high temperature catalytic treatment, such as catalytic cracking, and a low temperature catalytic or contact treatment, such as catalytic refining of gasoline or distillate fractions, or in polymerization of hydrocarbon gases.

One of the more serious problems involved in the catalytic conversion of hydrocarbon oils is the formation of carbonaceous deposits on the catalyst which rapidly reduces the activity thereof. In view of this, it is necessary to regenerate the catalyst at frequent intervals to burn or otherwise remove such carbonaceous deposits and to restore the activity of the material. During the regeneration, the temperature must be regulated carefully to prevent permanently impairing the catalyst activity. This regulation of the temperature during regeneration forms one of the more serious problems in catalytic conversions of this type. For example, it has been considered necessary in the past to provide a heat exchange surface within one inch of all catalyst particles in order to remove the heat from the regenerating zone at a rate which will avoid excessive temperatures which would impair the catalyst activity.

One of the important objects of the present invention is to provide a more simple and inexpensive method of regulating the temperature during regeneration.

A further important object of the present invention is to provide a process for the conversion of hydrocarbon oils which will more effectively utilize the catalyst between regenerations.

A further general object of the present invention is to provide an integrated, unitary process for the conversion of hydrocarbon oils which will produce a higher yield of final products or products of improved quality.

Other more specific objects and advantages of the invention will become apparent from the detailed description hereinafter in which reference will be made to the accompanying drawing which is a diagrammatic illustration of an apparatus capable of carrying the invention into effect.

Referring to the drawing, the reference character 10 designates a feed line through which the oil to be processed is introduced into the system. This oil may be a clean condensate stock

2 such as a gas oil, or it may be a residual stock such as a topped or reduced crude.

The oil introduced through line 10 is forced by means of pump 11 through a vaporizing coil 12 located in furnace 13. The oil during passage through the vaporizing coil 12 is heated to a temperature sufficient to vaporize a substantial portion of the oil so introduced. If desired, steam or other stripping gas may be introduced through line 14 into the oil stream passing through the vaporizing coil 12 to assist in the vaporization of the oil. The oil after passing through the vaporizing coil 12 is transferred through line 15 to a separator 16 in which the vapors separate from any unvaporized residue which may remain. Additional steam may be introduced into the separator 16 through line 17 to assist in the vaporization and separation of the vapors from the liquid residue. Any liquid residue remaining unvaporized in the coil 12 may be removed from the separator 16 through line 18. Vapors liberated in the separator 16 pass overhead through line 19 to a superheating coil 21 wherein the oil is subjected to further heating before passing to the cracking zone. For example, the overhead vapors from the separator 16 may be at a temperature of from 700° F. to 850° F. and the vapors after passing through the superheating coil 21 may be at a temperature of from 800° F. to 950° F.

In instances where a clean condensate stock which is completely vaporizable is employed as feed for the process, the separator 16 may be omitted or the valve in line 18 may be closed so that all products from the vaporizing coil 12 are passed overhead through line 19. The oil vapors after being heated to the desired degree in the superheating coil 21 pass through line 22 into which is added a cracking catalyst in finely-divided form through conduct 23 having a suitable feeding device such as a valve 24 for regulating the amount of catalyst introduced into the vapor stream. In order to insure the introduction of the powdered catalyst into the vapor stream, the catalyst at the point of entry should be at a pressure at least equal to the pressure on the oil vapors passing through line 22. To this end, the conduit 23 may be in the form of a vertical column having a height sufficient to develop a static pressure at the bottom thereof sufficient to feed the powder into the oil stream. In order to develop the necessary static pressure, the powdered material in the conduit 23 should be in fluidized state so that the pressure can be transmitted throughout the length of the column without packing or bridging. To this end, a fluidizing gas may be introduced into column 23 at one or more points through lines 25, 26 and 27. The catalyst introduced into the oil line 22 may be any suitable cracking catalyst in powdered or finely-divided form. This catalyst preferably consists of an activated clay, such as an acid-treated bentonite clay, or it may be a synthetic adsorptive gel of silica and alumina or other types of synthetic gels having cracking activity. The amount of catalyst introduced into the oil vapors will depend upon a number of factors, such as the character of the oil being treated, the activity of the catalyst, the degree of conversion desired, and the temperature of the cracking zone. When employing acid-treated clays of the character mentioned, the amount of catalyst so added will generally be between 0.5 and 10 parts of catalyst per part of oil by weight.

The suspension or dispersion of oil vapors and catalyst formed by the introduction of the catalyst into the oil line 22 is then passed into a cracking chamber 28 in which the oil vapors are retained for a period sufficient to obtain the desired degree of cracking. As illustrated, the cracking chamber 28 is in the form of a vertical tower or chamber through which the mixture of oil vapors and catalyst passes in an upward direction. The invention, however, in its broader phases is not limited to any particular type of cracking chamber. It is preferred, however, to pass the oil vapors upwardly through a cracking chamber at a velocity such as to cause the catalyst particles to travel through the reaction chamber at a rate materially lower than the velocity of the oil vapors. When operating in this manner, the density of the oil vapor-catalyst mixture within the cracking chamber will be materially greater than the density of the oil stream passing thereto. According to the preferred operation, the density within the reactor will be at least equal to twice the density of the stream passing thereto. For example, when the catalyst employed is an activated clay having a particle size of 200 mesh or finer, a linear velocity of from 1 to 3 feet per second will be sufficient to obtain the desired stream density within the reactor.

The suspension of cracked products and catalyst is removed from the cracking chamber 28 through line 29 and is passed to a cyclone separator 31 or other equivalent device for separation of the powdered catalyst from the cracked products. For simplicity, a single cyclone separator 31 is illustrated for this purpose. In many instances, however, it will be necessary to provide two or more separators to effect the desired separation of the catalyst from the oil vapors.

The catalyst separated from the cracked products in the separator 31 discharges into a vertical column 32 which may be in the nature of a standpipe similar to conduit 23 and into which a fluidizing gas may be introduced at one or more points through lines 33, 34 and 35. This catalyst so separated may be utilized for further refining or it may be subjected to regeneration as hereinafter described.

The cracked vapors after separation of the catalyst therefrom or after separation of at least the bulk of the powdered material are passed through line 36 to a fractionating tower 37 in which they are fractionated to condense the higher boiling constituents thereof as reflux condensate. The liquid condensate formed in the fractionating tower 37 is removed from the bottom thereof through line 38 and may be rejected from the system or it may be recycled to the superheating coil for further cracking treatment. The initial condensate formed in the fractionating tower 37 may contain some residual powder entrained in the cracked vapors removed from the separator 31. In this case, tower 37 may be provided with a separate trap-out tray (not shown) in order to segregate the initial condensate containing such powder. The top temperature of the fractionating tower 37 may be regulated to take overhead only the gasoline and lighter constituents of the cracked products, or the temperature may be maintained higher in order to remove overhead not only the gasoline but the kerosene and heating oil fractions of the cracked products.

Vapors remaining uncondensed in the fractionating tower 37 are removed therefrom through line 39. According to one phase of the invention, the total overhead stream, which may be gasoline constituents and lighter gases or which may be a combined stream of gasoline, heating oil, kerosene and lighter gases, may be passed through lines 39 and 41 to a transfer line 42 into which additional catalytic material is introduced through conduit 43. This catalytic material is preferably of the same composition as the catalyst employed in the cracking of the oils and may be obtained, for example, by tapping the vertical standpipe or conduit 23. The addition of catalyst to this stream is primarily for the purpose of purifying and stabilizing the lower boiling normally liquid fractions of the cracked products, or for polymerization of the higher boiling normally gaseous hydrocarbons formed during the cracking operation. This polymerizing, purifying and stabilizing treatment is preferably carried out at a temperature materially below the temperature of the cracking operation but above the vaporizing point of the oil being treated so that the treatment is carried out in vapor phase.

The mixture of oil vapors and catalyst formed in the transfer line 42 is then passed through line 44 to a refining chamber 45 wherein the unstable diolefins and other constituents may be polymerized and the hydrocarbon distillates stabilized against the formation of gums. The temperature within the refining chamber 45 may be, for example, of the order of from 400° F. to 700° F. As illustrated, the refining chamber 45 is in the form of a vertical tower or chamber through which the mixture of oil vapors to be refined and catalyst moves in an upward direction in the same manner as described in connection with the cracking chamber 28.

In lieu of or in addition to the introduction of the catalytic material into the vapor stream in line 42 through line 43 leading from column or conduit 23, a part or all of the catalyst employed for the refining treatment may be that which has previously been used for carrying out the cracking operation and which has been separated from the cracked products in the cyclone separator 31. For example, a part or all of the catalyst employed for refining may be introduced into the conduit 44 from the vertical standpipe or column 32 leading from the separator 31. The column 32 may be provided, for example, with a suitable valve or other regulating device for controlling the amount of such material introduced into the vapor stream.

The suspension of refined distillate vapors and refining catalyst after passing through the refining chamber 45 is withdrawn through line 46 and may be passed directly to a cyclone or other suitable separator 47 for separation of the catalyst from the oil vapors. The catalyst separated in separator 47 may discharge into a vertical tower or standpipe 48 having a height sufficient to develop a pressure which will feed the catalyst into a regenerating zone as hereinafter described. In order to take advantage of the height of the column 48 for developing the static pressure, a fluidizing gas such as steam or other inert gas may be introduced at one or more points through lines 49, 50 and 51.

The purified oil vapors separated from the catalyst in the separator 47 are removed therefrom through line 52 and are passed to a suitable condenser 53 for condensing the normally liquid constituents present in the gas. Products from the condenser 53 pass to a receiver 54 in which the liquid condensate formed in the condenser 53 separates from the normally gaseous constituents formed during the cracking operation or added to the oil during its passage through the equipment for vaporizing or for other purposes. The liquid separated in receiver 54 and which forms one of the final products of the process is withdrawn from receiver 54 through line 55 and subjected to any further finishing treatment desired. The gases separated from the liquid in receiver 54 are removed overhead through line 56 and may be passed to suitable recovery equipment for removal of any gasoline constituents entrained therein.

In cases where a mixture of gasoline and kerosene or heating oil vapors is purified in the refining chamber 45, the oil vapors removed from separator 47 through line 52 may be passed to a suitable fractionating column (not shown) for separation of the gasoline from the kerosene or heating oil fractions.

According to the above disclosure, the total overhead products from the product fractionator 37 are subjected to a purifying and refining treatment in the refining chamber 45.

According to another alternative of the present invention, the vapor products from the product fractionator 37 may be passed through line 39 to a condenser 57 wherein normally liquid hydrocarbon constituents are condensed. The products from the condenser 57 may then pass to a receiver 58 wherein the liquid formed in the condenser 57 separates from normally gaseous constituents formed in the cracking process. The normally gaseous constituents separated from the liquid in receiver 58 are withdrawn therefrom through line 59 and may be rejected from the system through line 60 and subjected to further recovery treatment for removal of entrained gasoline constituents, or these gases may be subjected to a polymerizing treatment later described. The liquid distillate collected in the receiver 58 may be withdrawn through line 61 and may be passed directly to the purifying chamber 45 through lines 62, 41, 42 and 44, or the liquid distillate removed from receiver 58 through line 61 may be first passed to a vaporizing coil 63 before passing through lines 41, 42 and 44 to the refining chamber.

As a further alternative, the liquid distillate obtained from the cracking operation previously described may be withdrawn from the equipment through lines 61 and 64 and the refining chamber 45 may be utilized for polymerization of the normally gaseous constituents such as the butane-butene fraction and the propane-propene fraction, or mixtures thereof. When operating in this manner, the overhead from the receiver 58 passes through lines 59, 65 and 66 to line 41 from which it passes through lines 42 and 44 to the refining chamber 45 which, in this instance, serves as a polymerizing zone for the gases formed in the cracking operation.

In lieu of passing the total gas from the cracking operation through the polymerizing zone 45, these gases may be further purified to remove hydrogen, methane and ethane before passing to the polymerizing chamber. To this end, the gas from line 65 may be passed through line 67 to a suitable absorber 68 in which the gases are passed in countercurrent contact with a suitable absorber oil such as a light naphtha, kerosene or gas oil capable of selectively absorbing the higher boiling constituents of the gases. This absorber oil may be, for example, the distillate fraction obtained in the cracking operation and collected in receiver 58. In this case, a part of the liquid distillate withdrawn from receiver 58 through line 61 may be passed through line 69 to the top of absorber 68 for absorbing the higher boiling constituents. The unabsorbed gases, which may comprise for the most part of hydrogen, methane and ethane, are removed from the absorber 68 through line 71. The enriched absorber oil after passing through the absorber 68 is removed from the bottom thereof through line 72. If desired, the enriched absorber oil may be passed from line 72 through line 73 to line 41 from whence it is circulated to the refining chamber through lines 42 and 44 as previously described. In lieu of passing the enriched absorber oil to the purifying chamber 45, this oil may be stripped of the lower boiling gaseous constituents and the stripped oil then recycled to the absorber. To this end, the enriched absorber oil withdrawn from absorber 68 through lines 72 and 74 may be passed to a stripping chamber 75 in which it may be heated to a temperature sufficient to vaporize the gases absorbed therein during passage through the absorber 68. In this case the gases liberated in the stripper 75 may pass overhead through line 76 to line 66 which merges with line 41 leading to the purifying chamber 45 as previously described. When operating in this manner, the lean absorber oil after being stripped of the absorbed gases is withdrawn from the bottom of the stripping chamber 75 through line 77 and after being cooled to the desired degree in cooler 78 it may be returned to the top of absorber 68.

Additional absorber oil for making up any losses in the absorbing system may be introduced through line 79.

Returning to the cyclone separator 47, the catalyst discharged therefrom into column 48 is fed into a gas stream such as air introduced through line 81 which may be used for conveying the catalyst into a regenerating chamber 82 maintained at a temperature sufficient to remove the carbonaceous deposits contained on the catalyst as a result of the cracking or the purifying treatment or both. To this end, an oxidizing atmosphere is maintained within the regenerating chamber 82. Due to the fact that the catalyst has previously been employed in a low temperature refining or polymerization treatment before passing to the regenerator, the temperature of the catalyst introduced into the regenerator will be at a materially lower level than would be the case if the catalyst were passed directly from the cracking process into the regenerator.

In order to realize the greatest benefits from the invention, the regenerating chamber 82 should be in the form of a vertical column similar to that described in connection with the cracking chamber 28 and the purifying or polymerizing chamber 45 in which the stream of regenerating gas and catalyst to be regenerated is passed in a vertical direction at a velocity such as to cause the catalyst to be retained within the regenerating chamber for a period materially longer than that for the regenerating gases passing thereto. When operating in this manner, the contents of the regenerating chamber become thoroughly mixed as a result of a continuous churning or agitation of the catalyst within the chamber. As a result, the regenerating chamber is maintained at a substantially uniform temperature throughout its full length. In view of this, the catalyst introduced into the regenerator may be at a temperature materially below its normal ignition temperature. Upon being introduced into the regenerating chamber, however, the temperature will rise rapidly to the regenerating temperature.

According to this invention, all of the catalyst may be first employed for carrying out the cracking operation and then further utilized at a lower temperature for carrying out the refining operation before passing to the regenerating chamber.

According to another phase of the present invention, freshly regenerated catalyst may be used both for the cracking process and for the purifying treatment. In the latter case, the catalyst separated from the cracked products in the separator 31 will pass through conduits 32 and 83 to the gas line 81 from which it will be carried by means of air or other carrier gas into the regenerating chamber and the catalyst separated from the refined gases will be passed into the regenerating chamber in a manner hereinafter described. In either case, the low temperature of the catalyst employed in the purifying treatment may be utilized for absorbing heat during the regeneration treatment of the catalyst utilized for cracking the oil.

If desired, a portion or all of the catalyst from the column 48 may be introduced directly into the regenerator 82 through line 84. The suspension of regenerated catalyst and gas after passing through the regenerating chamber 82 is transferred through line 85 to a suitable cyclone separator 86 in which the regenerated catalyst is separated from the gas. The gas separated from the catalyst is withdrawn from the separator 86 through line 87 and the catalyst may discharge into the vertical conduit 23 from which it may be returned to the cracking zone, to the purifying zone or both.

Returning to the refining or polymerizing chamber 45, in many cases the deposits formed on the catalyst during the low temperature refining treatment will contain substantial amounts of volatile material. In this case, it may be desirable to subject the catalyst removed from the refining chamber to a stripping operation to remove such volatile material before passing the same to the regenerating zone. To this end, the stream of refined vapors and catalyst removed from the refining chamber 45 through line 46 may be passed through line 88 to a cyclone separator 89 or other equivalent device for separation of the refined vapors from the catalyst. In such case the vapors separated from the catalyst in the separator 89 may be passed through line 91 to the condenser 53 for condensing the normally liquid constituents as hereinbefore described with respect to the vapors separated from the separator 47. The catalyst separated in the cyclone separator 89 may then discharge through column 92 into a stream of carrier and stripping gas introduced through line 94. The stripping gas and catalyst may then pass to a stripping chamber 95 in which the catalyst is stripped of its volatile constituents. This stripping chamber, for example, may be operated at a somewhat higher temperature than the purifying chamber 45 and this temperature together with the vaporizing effect of the stripping gas may be used for volatilizing the constituents retained on the catalyst. The stream of stripping gas and catalyst after passing through the stripping chamber 95 may then pass through line 96 which merges with line 46 leading to the cyclone separator 47. When operating in this manner, the gases removed from the cyclone separator 47 are preferably rejected from the process through line 97 or subjected to further purifying treatment for the recovery of the volatile constituents contained therein.

Another phase of the present invention is to utilize the heat of the freshly regenerated catalyst for effecting the vaporization or heating of the oil to be refined. For example, the regenerating chamber may operate at a temperature of the order of from 1000° F. to 1200° F. This catalyst while at substantially this temperature, upon being introduced through line 43 into the stream of oil to be purified, may be used for effecting vaporization of the oil without the necessity of using the vaporizing coil 63 and for reheating the oil to the desired refining temperature. Since the refining treatment is operated at a materially lower temperature than the cracking operation, the amount of catalyst necessary to preheat the oil for refining purposes will be materially less than that which will be necessary to vaporize and preheat the oil for the cracking process.

Although in the above description the advantages of the process have been enumerated especially with regard to operation wherein the temperature in reactor 45 is materially lower than the temperature in reactor 28, these advantages can also be realized in other operations in which the reactors are maintained at substantially the same temperature level, but the amount of carbonaceous deposits formed in one reactor or refining chamber is considerably less than in the other. For example, freshly regenerated catalyst may be withdrawn from standpipe 23 through draw-off 43 at a temperature of 1000° F. and may be mixed with coke-still naphtha introduced through line 98 at a temperature and in a ratio such that the temperature maintained in refining chamber 45 is 900° F., the same as that which might be maintained in reactor 28. In this case, after an isoforming reaction wherein only a small amount of coke is formed, the catalyst which is recovered in separator 47 and passed through standpipe 48 would have a temperature of the order of 875° F. and would exert a substantial cooling effect in regenerator 82.

In another modification, advantages are obtained by vaporizing liquid feed in one of the reactors by direct contact with the hot catalyst. For example, feed to the process introduced through lines 98, 42 and 44 may be vaporized or superheated in reactor 45 by contact with hot catalyst introduced from standpipe 23 and/or 32. The vapors separated from the catalyst in separator 47 may then be passed through lines 97 and 100 to the inlet or outlet of superheating coil 21 and thence to the cracking reactor 28. In some cases the oil vapors from line 100 may pass directly to the cracking reactor 28 without passing through the superheating coil. In this modification, efficient vaporization is obtained with a substantial saving in heat transfer equipment cost and at the same time cooling the catalyst to a temperature considerably below that existing in the regenerator.

When operating the process so that the catalyst is first used for cracking oil and thereafter used for refining the distillate vapors before regeneration, it may be necessary in some cases to add additional heat to the regenerating zone in order to maintain the required temperature. This can be accomplished by combining a portion of the catalyst from the cracking operation which is at a higher temperature with the catalyst from the purifying or refining process, or a combustible gas may be introduced into the regenerating chamber for supplying the required amount of heat.

While we have described the above process as a catalytic cracking process followed by purification of the cracked vapors from the cracking operation, it will be understood that the refining process may be employed for treating other naphtha or low-boiling distillate fractions in lieu of or in addition to that formed during the cracking operation. To this end, a naphtha that is to be polymerized or a low-boiling distillate fraction, such as naphtha, kerosene or heating oil, may be introduced into the refining equipment through line 98.

The invention finds particular application in processes where the same type of catalyst is employed both for the cracking and refining treatments. The invention does not preclude, however, the possibility of using different types of catalyst for the two treatments. In the latter case, however, the two types of catalyst employed must be separated from each other following the regenerative treatment. This separation can be accomplished by employing catalysts of different particle size and of different density for carrying out the two different treatments. It is much preferred, however, to employ the same type of catalyst for both operations.

The invention has been described as applied to a combination operation involving catalytic cracking of gas oils or other charging stock followed by refining of the cracked products or extraneous products of the same general boiling range. The invention also finds application to a combination in which the fresh feed to the catalytic cracking process is first subjected to a low temperature refining treatment to remove coke-forming constituents or to otherwise improve the cracking characteristics thereof. To this end, fresh oil to be cracked introduced through line 10, after passing through the vaporizing furnace 13 and separator 16, may be passed through lines 19, 99, 42 and 44 to the refining chamber 45. Catalyst for accomplishing the reaction may be introduced into line 44 either in the form of freshly regenerated catalyst through line 43, or in the form of catalyst recovered from the cracking operation through conduit 32. In general, it is preferred to use the latter as a refining agent. When operating in this manner, the refining chamber is operated at a temperature of from 600° F. to 800° F. and the time is controlled to avoid any substantial amount of cracking, although when employing heavy charging oil a substantial amount of viscosity breaking may be carried out in chamber 45. The oil vapors from the refining operation after being separated from the refining catalyst in separator 47, are then passed through lines 97 and 100 to the inlet side of the superheating coil 21 and are subjected to cracking treatment as previously described. In cases where it is desirable to strip the catalyst removed from refining chamber 45, the refined oil vapors may pass to the cracking vessel 28 through lines 91, 52, 97, 100, superheating coil 21 and line 22. The stripping gas used for the stripping operation removed from separator 47 in such cases may be combined with the refined vapors in line 97 as shown or removed from the system through a line not shown.

While we have described the preferred embodiment of the invention, it will be understood that it embraces such other variations and modifications as come within the spirit and scope thereof.

What is desired to be protected by Letters Patent is:

1. In a continuous combination process for the conversion and treatment of hydrocarbon oils wherein one hydrocarbon fraction is subjected to catalytic treatment in the presence of powdered catalyst in one treating zone maintained at an elevated active cracking temperature and a second hydrocarbon fraction is subjected to catalytic treatment with powdered catalyst of the same composition as that in said first-named treating zone in a second and independent treating zone wherein no substantial cracking is effected, said second zone being maintained at a materially lower temperature than said first-named treating zone and wherein the catalyst is separated from the treated fractions and subjected to regeneration to remove combustible deposits formed thereon during the treatment of said hydrocarbon fractions; the improvement which comprises combining the spent catalyst from said treating zones while at substantially treating temperatures, passing the resulting mixture through a regenerating zone, removing combustible deposits from said catalyst mixture passing through said regenerating zone, and thereafter passing a portion of the regenerated catalyst to one of said treating zones and another portion of said regenerated catalyst to the other of said treating zones.

2. A process for the catalytic conversion of hydrocarbon oils into lower boiling hydrocarbons suitable for motor fuel which comprises passing the oil to be converted in vapor form through a cracking zone in admixture with a finely-divided cracking catalyst, maintaining said zone at active cracking temperature, keeping said oil vapors within said cracking zone for a period sufficient to obtain a substantial cracking thereof, thereafter separating the powdered catalyst from the cracked vapors, fractionating the cracked vapors to form a higher boiling condensate fraction containing insufficiently cracked constituents and a lower boiling fraction, passing said lower boiling fraction through a conversion zone in admixture with a finely-divided conversion catalyst of the same composition as said cracking catalyst, maintaining said conversion zone under a temperature materially below the temperature of said cracking zone to thereby refine said lower boiling fraction, thereafter separating the conversion catalyst from the refined products, passing said last-named conversion catalyst recovered from said refined products and said cracking catalyst recovered from the cracked products through a common regenerating zone, maintaining an oxidizing atmosphere within said zone to burn carbonaceous deposits contained on said catalysts, thereafter removing the regenerated catalyst from the regenerating zone and returning regenerated catalyst so withdrawn to said cracking zone.

3. In the process defined by claim 2, the further improvement which comprises passing a portion of the catalyst removed from said regenerating zone to said cracking zone and a portion to said conversion zone.

4. A process for the conversion of higher boiling hydrocarbons into lower boiling hydrocarbons suitable for motor fuel which comprises passing the oil to be converted in vapor form through a cracking zone, contacting the oil with a finely-divided cracking catalyst during passage through said cracking zone, maintaining said oil vapors within said cracking zone at a temperature and for a period sufficient to convert a substantial portion thereof into lower boiling motor fuel constituents, thereafter separating the catalyst containing combustible deposits from the cracked products, simultaneously passing a lower boiling hydrocarbon fraction through a refining zone wherein no substantial cracking of said lower boiling fraction is effected, said refining zone being maintained at a temperature materially below said cracking zone, contacting said last-named lower boiling fraction within said refining zone with a finely-divided catalyst of the same composition as the catalyst contained in said cracking zone, thereafter separating the last-named catalyst from the refined products, treating said last-named catalyst to remove volatile constituents contained thereon, combining the catalyst so treated with the catalyst separated from said cracked products and passing the resulting mixture through a regenerating zone, removing combustible deposits contained on said catalytic material within said regenerating zone and thereafter passing at least a portion of said regenerated catalyst to the cracking zone.

5. A continuous process for the catalytic conversion of higher boiling hydrocarbons into lower boiling motor fuel constituents which comprises passing the oil to be converted in vapor form through a cracking zone, contacting said oil vapors within said cracking zone with a finely-divided cracking catalyst, maintaining the oil vapors in contact with said catalyst at a temperature and for a period sufficient to convert a substantial portion of said oil vapors into lower boiling motor fuel constituents, thereafter separating the catalyst from the cracked products, passing catalyst so separated through a regenerating zone, maintaining an oxidizing atmosphere within said regenerating zone to burn carbonaceous deposits formed thereon during the cracking treatment and to raise the temperature of said catalyst to a substantial extent, mixing freshly regenerated catalyst while at substantially regenerating temperature with a hydrocarbon fraction of lower boiling point than said first-named oil to be converted in an amount sufficient to vaporize said last-named lower boiling fraction, passing the resulting mixture through a conversion zone wherein no substantial cracking of said lower boiling fraction is effected, maintaining said mixture within said last-named conversion zone for a period sufficient to obtain the desired conversion thereof, thereafter separating the catalyst from the conversion products, treating the catalyst so separated to remove volatile constituents contained thereon as a result of the conversion treatment, subjecting the catalyst so treated to further regeneration and thereafter passing said last-named regenerated catalyst to said cracking zone.

6. A continuous process for the catalytic conversion of hydrocarbon oils which comprises passing the oil to be converted while in vapor form through a cracking zone, contacting said oil during passage through said cracking zone with a finely-divided cracking catalyst, maintaining said oil vapors in contact with said catalyst at a temperature and for a period sufficient to obtain the desired conversion thereof into motor fuel constituents, partially condensing said cracked products to form a higher boiling condensate fraction, passing the remainder of said cracked products through a refining zone, contacting the vapors passing through said refining zone with a catalyst of the same composition as that contained in said cracking zone, maintaining said last-named refining zone at a temperature materially below the temperature of the cracking zone, thereafter separating the last-named catalyst from the refined products, passing catalyst separated from said refined products and catalyst separated from said cracked products through a common regenerating zone, maintaining an oxidizing atmosphere within said regenerating zone, keeping said catalyst within said regenerating zone at a temperature and for a period sufficient to remove carbonaceous deposits formed on the catalyst during the conversion and refining treatment and thereafter further utilizing the regenerated catalyst in said cracking and refining chambers.

7. In the process defined by claim 6, the further improvement which comprises separating hydrogen and low-boiling constituents from the uncondensed cracked products before passing the same to said refining chamber.

8. In the process defined by claim 6, the further improvement which comprises maintaining said cracking zone at a temperature of from 800° F. to 1000° F. and said refining zone at a temperature of from 400° F. to 800° F.

9. In a continuous process for the conversion and treatment of hydrocarbon oils wherein a higher boiling hydrocarbon fraction is subjected to catalytic conversion in the presence of a powdered catalyst in a conversion zone and a hydrocarbon fraction of different composition is subjected to catalytic treatment in the presence of a powdered treating agent in a zone independent of said first-named conversion zone wherein no substantial cracking of said fraction of different composition is effected, said zone being maintained at a substantially lower temperature than said first-named zone and wherein the spent catalyst separated from the vaporous products of both said zones is subjected to regeneration to remove combustible deposits formed thereon during said conversion and treating; the improvement which comprises mixing the spent catalyst separated from the conversion products and treated products while substantially at conversion and treating temperature, passing the resulting mixture through a regenerating zone, burning the combustible deposits from said catalytic material passing through said regenerating zone, and thereafter passing a portion of the regenerated catalyst to said first-named conversion zone and another portion of the regenerated catalyst to said treating zone.

10. A process for the conversion of hydrocarbon oils which comprises passing a higher boiling hydrocarbon oil through a cracking zone, contacting the oil during passage through said cracking zone with a finely-divided cracking catalyst, maintaining said cracking zone at a cracking temperature, keeping said oil within said cracking zone for a period sufficient to crack a substantial portion thereof into lower boiling motor fuel constituents, thereafter separating the finely-divided catalyst containing carbonaceous deposits from the cracked vaporous products, simultaneously passing a hydrocarbon fraction of different composition than said first-named hydrocarbon oil through a conversion zone independent of said cracking zone and maintained at a materially lower temperature than said cracking zone, contacting said hydrocarbon fraction passing through said conversion zone with a finely-divided catalytic material, maintaining said last-named hydrocarbon fraction in contact with said catalytic material within the conversion zone for a period sufficient to obtain the desired conversion but no substantial cracking thereof, thereafter separating the catalyst from the conversion products, mixing catalyst separated from the cracked vaporous products with the catalytic material separated from the conversion products, passing the resulting mixture through a regenerating zone, burning combustible deposits from said catalyst mixture during passage through said regenerating zone, and returning a portion of the regenerated catalyst to the cracking zone and another portion to said conversion zone.

11. A continuous process for catalytic conversion of higher boiling hydrocarbons into lower boiling hydrocarbons which comprises passing the oil to be converted through a cracking zone, contacting said oil within said cracking zone with a finely-divided cracking catalyst, maintaining the oil in contact with said catalyst at a temperature and for a period sufficient to crack a substantial portion thereof into lower boiling constituents, thereafter separating the catalyst containing combustible deposits from the cracked products, passing the catalyst so separated through a regenerating zone, burning combustible deposits contained on said catalyst during passage through said regenerating zone, mixing regenerated catalyst while at substantially regenerating temperature with a hydrocarbon fraction of different composition than said first-named higher boiling fraction, regulating the amount of regenerated catalyst mixed with said last-named fraction to vaporize said oil and heat it to the desired conversion temperature, passing the resulting mixture through a conversion zone, maintaining said mixture in said conversion zone for a period sufficient to obtain the desired conversion but no substantial cracking of said hydrocarbon fraction, thereafter separating the catalytic material from the conversion products, subjecting catalytic material separated from said conversion products to regeneration to remove combustible deposits formed thereon during the conversion treatment, and thereafter passing the catalytic material resulting from the last-named regenerative treatment to said first-named cracking zone.

12. In the process defined by claim 11, the further improvement which comprises passing the catalyst separated from said cracked products and the catalyst separated from said conversion products to a common regenerating zone.

13. In a combination process for the conversion and treatment of hydrocarbon oils wherein one hydrocarbon fraction is subjected to catalytic treatment in the presence of powdered catalytic material and a second hydrocarbon fraction of different composition is subjected to catalytic treatment in the presence of a powdered catalytic material in a separate and independent treating zone wherein no substantial cracking of said second hydrocarbon fraction is effected, said last-named zone being maintained at a materially lower temperature than is maintained in the first-named catalytic treatment, the catalyst separated from the respective treated fractions and regenerated to remove combustible deposits formed thereon during the treating steps; the improvement which comprises mixing the regenerated catalysts from the two treating zones, passing the resulting mixture through a regenerating zone, removing combustible deposits from said mixture during passage through the regenerating zone, and thereafter passing a portion of the regenerated catalyst to one of said treating zones and another portion to the other of said treating zones.

14. In a combination process for the conversion of hydrocarbon oils wherein one hydrocarbon fraction is subjected to catalytic treatment in the presence of a finely-divided catalytic material in a treating zone, a second hydrocarbon fraction is simultaneously subjected to catalytic treatment with no substantial cracking of said second hydrocarbon fraction in the presence of a finely-divided catalytic material in a second treating zone separate and independent of and maintained at a materially lower temperature than said first-named treating zone, the catalysts separated from the respective treated fractions and regenerated to remove combustible deposits formed thereon during the treatment of said fractions; the improvement which comprises mixing the catalysts separated from the two treating zones, passing the resulting mixture into a regenerating zone, passing an oxidizing gas upwardly through said regenerating zone at a velocity controlled to maintain a dense turbulent mass of catalytic material within said regenerating zone, burning combustible deposits from the catalytic material within said regenerating zone, thereafter withdrawing the regenerated catalytic material from said regenerating zone, and passing a portion of the regenerated catalytic material to one of said treating zones and another portion of said regenerated material to the other of said treating zones.

15. A method of operating a catalytic conversion system employing finely divided solid catalyst particles in a regeneration zone and two conversion zones which method comprises passing a stream of oxidizing gas and finely divided catalyst containing combustible deposits upwardly into a regenerating zone at a velocity controlled to maintain a relatively dense turbulent mixture of catalyst and oxidizing gas within the regenerating zone, continuously removing a stream of regenerated catalyst from said regenerating zone, combining a portion of the catalyst so removed with fresh charging oil to be converted, passing the resulting suspension upwardly through a primary conversion zone at a velocity controlled to form a relatively dense mixture of catalyst particles and oil vapors within said zone, maintaining said oil vapors in contact with said finely divided catalyst at conversion temperature for a period sufficient to obtain substantial conversion thereof, separating catalyst from the conversion products, introducing the catalyst so separated into an oxidizing gas and passing the resulting mixture to the regenerating zone, fractionating the vaporous conversion products to segregate a naphtha fraction and a higher boiling fraction, combining the remaining portion of said regenerated catalyst with said naphtha fraction so segregated, passing the resulting suspension upwardly through a refining zone at a velocity controlled to form a relatively dense mixture of oil vapors and catalyst within said refining zone, maintaining said naphtha vapors in contact with said catalyst within said refining zone for a period sufficient to obtain a substantial refining thereof, separating catalyst from the refined vapors, introducing the catalyst so separated into a stream of oxidizing gas, passing the resulting suspension to a regenerating zone, and condensing the vapors from said refining zone.

EDWARD D. REEVES.
JOHN C. MUNDAY.

REFERENCES CITED

The following references are of record in the file of this patent:

UNITED STATES PATENTS

| Number | Name | Date |
|---|---|---|
| 2,235,133 | Zimmerman | Mar. 18, 1941 |
| 2,253,486 | Belchetz | Aug. 19, 1941 |
| 2,249,595 | Benedict | July 15, 1941 |
| 2,265,837 | Harding | Dec. 9, 1941 |
| 2,271,670 | Thomas | Feb. 3, 1942 |
| 2,290,580 | Degnen et al. | July 21, 1942 |
| 2,296,722 | Marancik et al. | Sept. 22, 1942 |
| 2,357,136 | Rubin | Aug. 29, 1944 |
| 2,349,575 | Voorhees | May 23, 1944 |
| 2,339,874 | Nysewander | Jan. 25, 1944 |
| 2,300,032 | Kassel | Oct. 27, 1942 |

FOREIGN PATENTS

| Number | Country | Date |
|---|---|---|
| 380,869 | Italy | June 8, 1940 |